United States Patent [19]
Abraham et al.

[11] 3,915,935

[45] Oct. 28, 1975

[54] POLYURETHANE ADHESIVE COMPRISING A POLYESTER AND A PREPOLYMER OF THE SAME POLYESTER

[75] Inventors: Denzil S. Abraham, Sileby; Austin T. Carpenter; Alan Hardy, both of Leicester, all of England

[73] Assignee: USM Corporation, Boston, Mass.

[22] Filed: Feb. 28, 1974

[21] Appl. No.: 446,747

[52] U.S. Cl......... 260/75 NP; 161/190; 260/75 NK; 260/75 NT
[51] Int. Cl.$^2$.................. C08G 18/10; C08G 18/28; B32B 27/40
[58] Field of Search....... 260/75 NP, 75 AN, 75 NT

[56] References Cited
UNITED STATES PATENTS

| | | | |
|---|---|---|---|
| 3,193,522 | 7/1965 | Neumann et al. | 260/77.5 A |
| 3,309,261 | 3/1967 | Schiller et al. | 161/190 |
| 3,483,150 | 12/1969 | Ehrlich et al. | 260/75 NP |
| 3,640,966 | 2/1972 | Hennig et al. | 260/75 NT |
| 3,644,569 | 2/1972 | Pietsch et al. | 260/858 |
| 3,686,146 | 8/1972 | Goto | 260/75 NP |

*Primary Examiner*—H. S. Cockeram
*Attorney, Agent, or Firm*—Benjamin C. Pollard; Vincent A. White; Richard B. Megley

[57] ABSTRACT

A two-part adhesive composition curable to tough solid state by mixture and reaction of its components in which the components are two normally liquid parts, the first part including a polyester polyol having —OH functionality of from about two to about three and an equivalent weight of from about 100 to about 500 and the second part including a prepolymer of a similar polyester polyol and an organic polyisocyanate, the prepolymer having a reactive —NCO functionality from about two to three. The parts are compounded such that mixture in generally equal parts by volume will give a cure index of from about 100 to about 400.

This invention is concerned with improvements in or relating to adhesive compositions.

5 Claims, No Drawings

POLYURETHANE ADHESIVE COMPRISING A POLYESTER AND A PREPOLYMER OF THE SAME POLYESTER

BACKGROUND OF THE INVENTION

Adhesive compositions which can provide a bond of high strength are known which are provided in a two-part form; that is to say the adhesive composition is stored prior to use as two separate component parts which can then be admixed shortly before use to provide a curing adhesive composition. Once the two component parts of such an adhesive composition have been mixed together the composition cures to a strong bond-forming condition over a period of time. Two-part adhesive compositions are used in industrial applications and also "do-it-yourself" applications.

Two-part adhesive compositions may be provided by curing epoxy resin systems in which one of the two parts comprises an epoxy resin and the other part comprises a curing agent therefor. Some of these compositions tend to be smelly. Also they tend not to form a good bond immediately after mixing but rather allow sliding of substrates until just before the mixed compound sets. Hand mixing of two-part adhesive compositions by "do-it-yourself" users is normally a process requiring a high degree of operator judgement, and frequently estimated mixing volumes are not closely in accordance with those intended.

BRIEF SUMMARY OF THE INVENTION

It is an object of the present invention to provide an adhesive composition which comprises two storage stable parts which can be mixed together to provide a polyurethane composition curing to a tough bond-forming condition. The expression "storage stable" as used here and elsewhere in the specification is means capable of storage in a sealed container for at least three months at ambient temperatures without such change in its content of reactive —OH or —NCO groupings as to interfere with reaction of substantially equal volumes of Parts A and B to form a cured adhesive.

It is another object of the present invention to provide a two-part polyurethane composition of which the two parts are intended to be mixed in substantially equal volumes, but which in practice is tolerant of errors in measuring the volumes.

BRIEF STATEMENT OF THE INVENTION

We have now found that an adhesive composition comprising two storage stable Parts A and B which can be mixed together as fluids to provide a polyurethane composition curing to tough bond-forming condition in this composition, the Part A comprises polyol consisting of or including an at least difunctional polyester polyol, and the Part B comprises prepolymer formed from an at least difunctional polyester polyol and organic isocyanate material and having more than two isocyanate groups available for chemical reaction with the Part A polyol.

DETAILED DESCRIPTION OF THE INVENTION

The polyester polyol of the Part A of the present two-part adhesive has, according to the invention, effectively more than two but not substantially more than three hydroxyl groups per molecule. It has been found that if the polyester of the Part A has less than two hydroxyl groups per molecule, then some bond strength in the resultant composition is lost, and if the polyester of the Part A has effectively significantly more than three hydroxyl groups per molecule then bonds formed by use of the resultant composition may tend to become too brittle. In order to provide a workable adhesive composition forming adequate bonds, the polyester of the Part A also has a relatively low equivalent weight, which may be from about 100 to about 500 and preferably from about 200 to about 300.

The polyester polyol of the Part A may be a blend of polyesters. We prefer to use a saturated, branched polyester polyol formed from mixed dicarboxylic acids (e.g. mixed aliphatic and aromatic dicarboxylic acids), at least one diol and at least one triol. Suitable diols include aliphatic glycols such as 1,2 propylene glycol, diethylene glycol, 2 ethyl 1,3 hexane diol, triethylene glycol and mixtures of these. Triols useful for reaction to form the polyester polyol include 1,2,6 hexane triol, 1,1,1, trimethylol ethane, pentaerythritol, and tris (2 hydroxy ethyl) isocyanurate and mixtures of these, Aliphatic dicarboxylic acids for reaction with the diols and triols include adipic acid, succinic acid, glutaric acid and mixtures of these. A preferred aromatic dicarboxylic acid is phthalic acid. One particularly desirable polyester polyol is an esterification product of adipic acid, phthalic acid, a mixture of diols including propylene glycol, diethylene glycol and 2 ethyl hexane diol, and a triol which may be 1,2,6 hexane triol or trimethylol propane. The preferred polyester has a hydroxyl value of from 205 to 221, and an equivalent weight of about 260.

The Part A may contain a proportion of trifunctional alcohol, such as the triols mentioned above in addition to the polyester polyol to give increased cross linking. This effect is secured with addition of at least about 1%, but large quantities i.e. more than about 10% weight in the Part A are undesirable as the Part A tends to become too viscous to permit easy mixing of the composition at normal temperatures.

The Part A may also include a catalyst system to catalyze the hydroxyl isocyanate reaction. A preferred catalyst system has been found to be triethylenediamine with dibutyl tin dilaurate, but other known catalysts including tertiary amines such as N-methyl morpholine and various tin, lead, or mercury salts of organic acids alone or in admixture may be used. The set-up time of the adhesive composition (i.e., the length of time which elapses between mixing of the Parts A and B and the adhesive composition achieving a bondforming condition) which is of the order of more than one hour without catalysts present, is influenced by the nature and quantity of catalysts present, greater quantities of catalyst normally leading to a shorter set-up time.

The Part B includes a prepolymer or reaction product of a polyester polyol and an organic polyisocyanate reactive with the polyol. The polyester polyol used for making the reaction product of the Part B may be of the same class as the polyester polyol of the Part A. The polyisocyanate material used in making the reaction product of the Part B may be any organic polyisocyanate having an -NCO functionality between about 2 and about 3 such as the carbodiimide of 4,4' diphenyl methane diisocyanate containing additional 4,4' diphenyl methane diisocyanate to give a liquid product, polymethylene polyphenylene isocyanate and a normally liquid 4,4' diphenyl methane diisocyanate material understood to contain higher functionality dimers and trimers, but, where lack of color and ease of mixing the composition are important we prefer to use a liquid material containing a carbodiimide of 4,4" diphenyl methane diisocyanate and uncombined 4,4' diphenyl methane diisocyanate having an —NCO functionality of the order of 2.4. Preferably the polyesterisocyanate reaction product has from 15% to 28%, more preferably about 18% to about 22% isocyanate groups, by weight of the reaction product available for reaction with active hydrogens of the Part A.

Use of organic isocyanates having a functionality effectively in excess of 3 tends to lead to prepolymers which are more highly cross-linked and awkward to process.

The presence of water in the adhesive composition at the time of mixing the two Parts A and B is to be avoided since it tends to lead to bonds of low strength. The presence of solvents is undesirable particularly if a fast setting adhesive composition is required since, amongst other things, the elapse of time required to "dry off" the solvent during a bonding operation is not desirable.

In the adhesive composition the constituents are preferably chosen and combined in proportions so that optimum bonding properties may be achieved when the Parts A and B are mixed in a ratio or 1:1 by volume. With the composition of Example 1, described, optimum bonding properties are achieved with a cure index (i.e., the quotient of available isocyanate groups of the Part B and available hydroxyl groups of the part multiplied by 100) of 130, and with the composition of Example 2, hereinafter described, optimum bonding properties are achieved with a cure index of 120; satisfactory bonds for many purposes may be achieved if the cure index is less than 100 or greater than 150, but for best results the cure index preferably lies between about 100 and about 140. With the preferred materials, the mixing ratio by volume is not especially critical and satisfactory bonds may be obtained when the Parts A and B are mixed in ratios between 80:100 and 100:80 by volume.

Compositions according to the invention have been found to provide considerably bonding ability shortly after mixing and application, and exhibit minimal odour. The compositions have been found to have good stability when exposed to temperatures from −10° C to 110° C and resistance to action of sulphuric acid and caustic soda.

Various additives commonly included in adhesive compositions may be included in a composition according to the invention, for example, fillers, plasticisers and adhesion promoting agents, for example, epoxy silanes, mereapto silanes or amino silanes. It is important that all additives used should be essentially water-free, and in this respect it may be desirable to include water scavengers, especially if the adhesive composition is intended to have a long set-up time.

Adhesive compositions according to the invention may be mixed and then applied to a first substrate and a second substrate pressed against the adhesive. Alternatively the Part B may be applied as a thin layer to the first substrate, a thin layer of Part A applied on top of it and then the second substrate pressed against the adhesive layer.

The following examples are given to aid in understanding the invention, but it is to be understood that the invention is not restricted to the materials, proportions or procedures recited in the examples.

EXAMPLE I

A storage stable solvent-and-water-free two-part adhesive composition was prepared of which the parts have the following formulation:

PART A
| Polyester Polyol | 100.00 parts by weight |
|---|---|
| Triethylenediamine | 0.20 parts by weight |
| Dibutyl Tin Dilaurate | 0.10 parts by weight |

PART B'
| Reaction product of: | |
|---|---|
| Polyester Polyol | 100.00 parts by weight |
| Organic Polyisocyanate | 398.8 parts by weight |

The polyester polyol used both in the Part A and in the Part B was a saturated branched polyester from condensation and polymerization of a polyol mixture of the following composition:

| 1,2 propylene glycol | 64 parts by weight |
|---|---|
| Diethylene glycol | 13 parts by weight |
| 2-ethyl 1,3 hexane diol | 13 parts by weight |
| 1,2,6 hexane triol | 100 parts by weight | and an acidic mixture of the following composition:

| Adipic Acid | 58.7 parts by weight |
|---|---|
| Phthalic acid | 4.7 parts by weight |

The polyol material and the acid material were combined and reacted in proportions providing a polyester polyol having an equivalent weight of about 260, the product being liquid at room temperatures.

In the preparation of the Part A, the polyester polyol was heated to 80° C to degas and dehydrate it. The triethylendiamine and the dibutyl tin dilaurate were then added with stirring and the whole heated to degas and dehydrate the mixture.

The polyisocyanate used was a liquid composition containing 4,4' diphenyl methane diisocyanate and the carbodiimide of 4,4' diphenyl methane diisocyanate, the polyisocyanate and polyester polyol of the Part B being combined in proportions to yield a prepolymer having about 20% by weight of the prepolymer of isocyanate groups available for reaction. The prepolymer was a liquid at room temperature.

In the preparation of the prepolymer of the Part B, the polyisocyanate was heated to 50° C. and dehydrated polyester was added slowly with stirring over a period of 20 minutes. The rate of addition of the polyester to the isocyanate was such that the temperature of the reaction mixture did not exceed 55° C. Reaction between the polyester and the isocyanate was completed in 15 minutes after the addition.

In order to test bonding ability of the adhesive composition, portions of the Parts A and B were mixed together in a ratio of 1:1 by volume. The mixed compositions showed an immediate and gradually increasing bonding ability with reduced tendency to slip before setting as compared with two-part epoxy adhesives, and readily bonded to flexible and rigid polyvinyl choloride, polystrene, acrylic polymer resin sheet, GRP, ABS, Glass, steel, aluminum and to a lesser extent polyethylene. The strength of the bonds increased significantly over 24 hours following formation of the bond.

Tests were carried out to examine the storage stability of the Part B or the composition, and the bond strengths of sample bonds, made using the illustrative composition. In the storage stability test, a quantity of Part B was made and its reactive isocyanate content determined by titration of a test sample with diisobutylamine solution and back titration with hydrochloric acid. The remaining quantity of Part B was placed in two metal containers, the containers were sealed and one stored at room temperature and the other at 50° C. Test samples were removed from the containers at intervals and their reactive isocyanate content determined. The results are shown in Table I, the reactive isocyanate content being specified as a percentage by weight of the Part B.

In testing the bond strengths of sample bonds triplicate sets of sample bonds were made up as follows. Pairs of similar two inch by one inch strips of a material were cleaned. Portions of the compositions were made up, using a 1:1 mixing ratio by volume of the relevant Parts A and B. A portion of the adhesive was spread on to one strip of each pair and the other of the pairs pressed against the adhesive layer using hand pressure only. In each case the formation of the bond was completed within two-and-a-half minutes of mixing the adhesive composition.

One triplicate group of sample steel to steel bonds made using the adhesive composition was tested in shear immediately on completion of the bond and found to exhibit bond strengths from 0.18 to 0.25 tons per square inch 10 minutes after formation of the bond. Repetition of the test 1 hour after formation of the bond showed a bond strength of 0.25 ton per square inch. Examination of the steel to steel bonds and shear testing after 1 week revealed bond strengths of the order of 0.7 tons per square inch. The remainder of the sample bonds were aged for 2 days at 25° C and then tested in shear. The results, in pounds per square inch are given in Table 2. In all the shear tests referred to herein the samples were pulled apart at 1 inch per minute. By way of comparison similar sets of sample bonds were made up using a commercially available fast curing epoxy plus curing agent two-part adhesive composition which sets within about 5 minutes of mixing. This composition allows considerably more slip between the substrates (which persists until the adhesive sets) than the illustrative composition, and, in making the sample bonds of the control series, the strips were held clamped together with the adhesive composition between them for a period of 10 minutes after mixing the composition whilst the composition was setting.

TABLE I

| Months elapsed after making Part B. | Storage Stability NCO Content (% by weight of Prepolymer) | |
|---|---|---|
| | Stored at Room Temperature | Stored at 50 C. |
| 0 | 19.8 | 19.8 |
| 5½ | 19.7 | 19.3 |
| 6½ | 19.6 | 19.3 |
| 8 | 19.6 | 19.3 |

TABLE II

| Substrates | Bond Strength lbs./sq. inch | |
|---|---|---|
| | Control | Composition of Example I |
| Acrylic Polymer Sheet | 83 | 96 |
| Rigid Polyvinyl Chloride | 135 | 179 |
| Polythene | 52 | 60 |
| G.R.P. | 152 | 588 |
| A.B.S. | 119 | 354 |
| Glass | 336 | 805 |
| Steel | 1120 | 1584 |
| Aluminum | 760 | 885 |

Note: All substrates bonded to themselves.

EXAMPLE 2

Parts A and B were prepared according to the following formulation:

| PART A | | |
|---|---|---|
| Polyester Polyol | 93.00 | parts by weight |
| Triethylenediamine | 0.20 | parts by weight |
| Dibutyl tin dilaurate | 0.01 | parts by weight |
| Trimethylol propane | 7.00 | parts by weight |
| PART B | | |
| Polyester polyol | 100 | parts by weight |
| Organic polisocyanate | 544.8 | parts by weight |

The polyester used in the Parts A and B of this composition was the same as that employed in Example 1. The Part A was prepared by procedure similar to that of Example 1 except that the trimethylol propane was substituted for the 1,2,6 hexane triol in the mixture comprising the polyester polyol. The isocyanate used in this example was a crude diphenyl methane diisocyanate containing some higher functionality isocyanate. The procedure for forming the prepolymer was the same as in Example 1. The initial isocyanate content of the Part B of the second illustrative composition was 22.2% by weight of the prepolymer.

Bond tests were carried out following the procedure set forth in Example 1 and the results of these bond tests are included in Table III.

TABLE III

| | Bond strength lbs/sq. inch Composition of Example II |
|---|---|
| Acrylic Polymer Sheet | 96 |
| Rigid Polyvinyl Chloride | 208 |
| Polythene | 41 |
| G.R.P. | 722 |
| A.B.S. | 387 |
| Glass | 1480 |
| Steel | 715 |

EXAMPLE 3

Parts A and B of a two-part adhesive were made up having formulas similar to that of Example 1, but using the following polyester polyols in the Part A in place of the polyester polyol shown in that example:

A. The product of reacting a mixture of one-half mol of glycerin and 1 mol of diethylene glycol with an acid mixture comprising in parts by weight 31 parts of succinic acid for 39 parts of glutaric acid and 30 parts of adipic acid, the materials being combined and reacted to form a liquid polyester polyol having an equivalent weight of 193 and a functionality of about three.

B. A polyester similar to A in which the acid mixture is used and 1 mol of glycerine is combined with 3 mols of triethylene glycol and reacted with 3 mols of the mixed acid to form a polyester polyol having an equivalent weight of 250 and a functionality of about three.

C. A polyester polyol form combination of 0.5 mols of trimethylol propane and 1 mol of diethylene glycol with one mol of the same mixed acid as in polyester polyol A, the polyester polyol having an equivalent weight of 250 and a functionality of about three.

A combination of substantially equal volumes of these Part A's with the Part B of Example 1 showed immediate and gradually increasing bondability with reduced tendency to slip before setting as compared with two-part epoxy adhesive.

Having thus described our invention, what we claim as new and desire to secure by Letters Patent of the United States is:

1. A liquid substantially solvent-free and water-free adhesive composition curable to tough solid state resulting from admixture and reaction of (1) a normally liquid saturated branched polyester polyol having an —OH functionality of from about two to about three and an equivalent weight of from 100 to 500 and (2) a normally liquid prepolymer having a reactive —NCO functionality of from about two to about three and containing from about 15% to about 28% reactive -NCO groups by weight of said prepolymer, said prepolymer being the product of reacting a polyester polyol having an —OH functionality of from about two to about three and an equivalent weight of from 100 to 500 and an organic polyisocyanate in amount in excess over the stoichiometric amount of the polyester polyol, said adhesive comprising from about 80% to about 125% by volume of said saturated branched chain polyester polyol relative to the volume of said normally liquid prepolymer, the polyester polyol and prepolymer, being compounded to provide that a volume of said prepolymer will contain a quantity of reactive —NCO groups relative to the quantity of reactive —OH groups in the same volume of said polyester polyol to produce a cure index of from about 100 to about 140.

2. A liquid adhesive composition as defined in claim 1 in which said polyester polyol is a saturated, branched polyester polyol formed from mixed aliphatic and aromatic dicarboxylic acids, at least one diol and at least one triol.

3. A liquid adhesive composition as defined in claim 2 in which said first part includes a triol to the extent of from about 1% to about 10% by weight based on the weight of said polyol and a catalyst for the reaction between the isocyanate and active hydrogens of the —OH functionality.

4. A liquid adhesive composition as defined in claim 3 in which said polyester polyol of the first part has an equivalent weight of from about 200 to about 300 and is formed by reaction of mixed acids including phthalic and at least one aliphatic acid from the group consisting of adipic acid, succinic acid and glutaric acid, at least one diol from the group consisting of propylene glycol, diethylene glycol, 2 ethyl, 1,3 hexane diol, and triethylene glycol and at least one triol from the group consisting of 1,2,6 hexane triol, 1,1,1 trimethylol ethane, pentaerythritol, tris (2 hydroxy ethyl) isocyanurate and trimethylol propane.

5. A liquid adhesive composition as defined in claim 4 in which said prepolymer is the reaction product of a polyester polyol as defined in claim 4 and an organic polyisocyanate from the group consisting of carbodiimide of 4,4' diphenyl methane diisocyanate containing additional 4,4' diphenyl methane diisocyanate to give a liquid product, polymethylene polyphenylene isocyanate and a normally liquid 4,4' diphenyl methane diisocyanate containing higher functionality dimers and trimers, said prepolymer having from about 18% to about 22% isocyanate groups by weight of the prepolymer.

* * * * *